H. G. FISK.
Shirt.
No. 161,110.    Patented March 23, 1875.
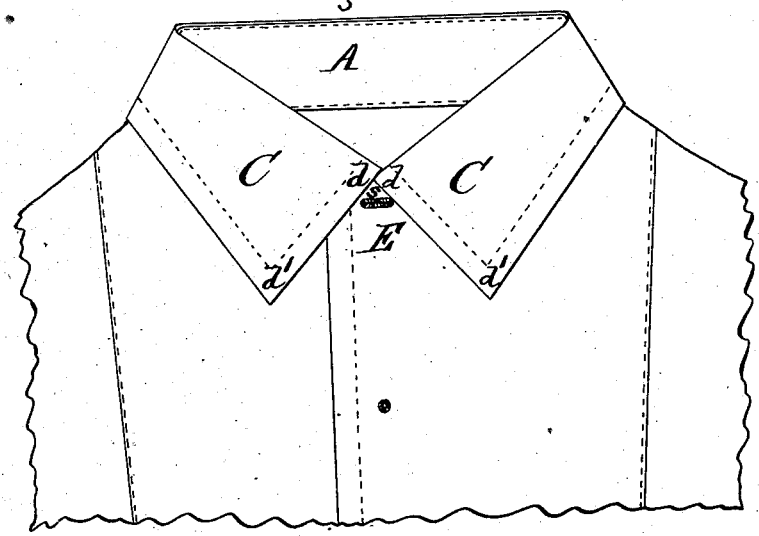
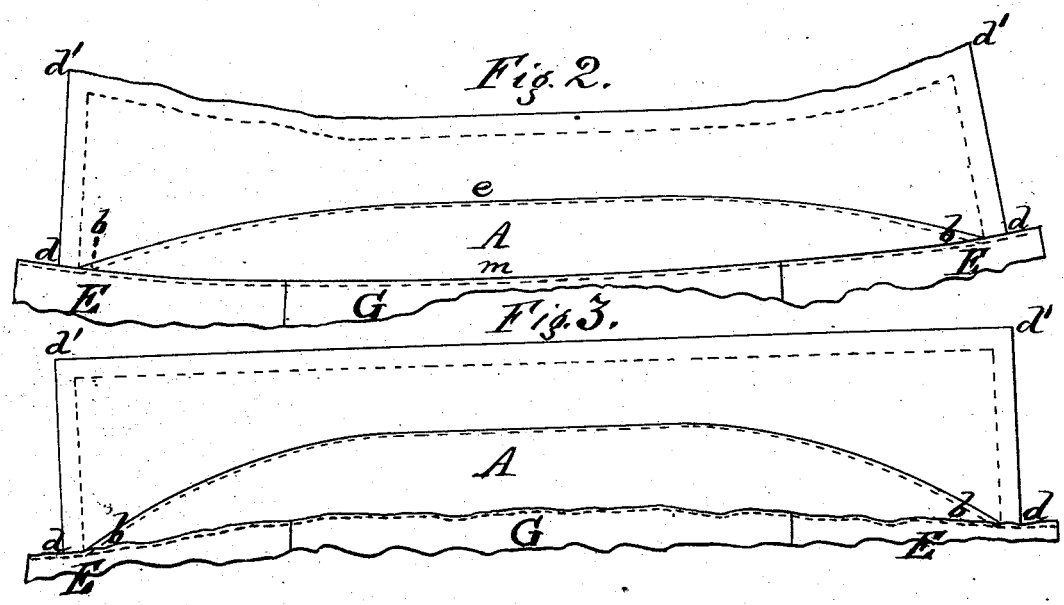
Witnesses
W. L. Bennem
W. H. Isaacs.
Inventor
H. G. Fisk
by his att'y E. S. Renwick

UNITED STATES PATENT OFFICE.

HENRY GREEN FISK, OF NEW YORK, N. Y., ASSIGNOR TO FISK, CLARK & FLAGG, OF SAME PLACE.

IMPROVEMENT IN SHIRTS.

Specification forming part of Letters Patent No. 161,110, dated March 23, 1875; application filed December 12, 1874.

*To all whom it may concern:*

Be it known that I, HENRY GREEN FISK, of the city, county, and State of New York, have made an invention of a new and useful Improvement in Shirts; and that the following is a full, clear, and exact description and specification of the same.

The object of this invention is to cause the front ends of the shirt-collar, when turned down, to lie flat and in close contact with the bosom, without presenting to view any portion of the neck-band; and, to this end, the invention consists of a peculiar combination of the collar, the bosom, and the neck-band of a shirt.

In order that the invention may be fully understood, I have represented in the accompanying drawing and will proceed to describe portions of a shirt embodying my invention.

In the said drawings, Figure 1 represents a front view of a portion of a shirt with the collar turned down. Fig. 2 represents a portion of the shirt with the neck-band extended and laid flat. Fig. 3 represents a portion of the same with the collar extended and laid flat.

In making a shirt according to the invention the neck-band A is cut so as to be pointed at each end when sewed, and of such length that the pointed ends $b\ b$, when sewed to the collar C, shall terminate inside of the ends $d\ d'\ d\ d'$ of the collar, or shall not extend between the ends of the collar and the bosom E. To this end, the upper edge of the band is cut in a curve, so that when the raw edge is turned in it will appear as shown by the line $b\ e\ b$, Fig. 2. The lower edge of the band also is curved, so that when it is sewed to the yoke G and bosom E of the shirt it appears as represented by the line $b\ m\ b$, Fig. 2. The collar is cut by preference so as to be straight at its upper edge, and curved at its lower edge with a curvature slightly more concave than that of the upper edge of the band, so that when the collar is turned down it will diverge slightly from the band. When the parts are sewed together they will present the appearance shown in the drawings, with the pointed ends $b\ b$ of the neck-band terminating inside of the ends $d\ d'\ d\ d'$ of the collar, and without any portion whatever of the neck-band intervening between the ends $d$ of the collar and the bosom E of the shirt. Hence when the collar is turned down, as in Fig. 1, the collar ends lie directly against the bosom, without showing any portion of the neck-band between the two.

In making the shirt, the button holes for the neck-stud are formed in the bosom as shown at $s$, Fig. 1, and, as there is neither neck-band nor wrinkle exhibited between the collar and the bosom, the necessity of using a bow or neck-tie to conceal such band or wrinkle is avoided.

I am aware that neck-bands curved at both their upper and lower edges have been used, as described in the patent granted to J. A. Jones, No. 103,155, dated May 17, 1870. In these, the ends of the band intervened between the front ends of the collar and bosom, and were seen there; moreover, the presence of these intervening ends of the band permitted the collar ends to stand off from the bosom; whereas, by my invention the front ends of the collar are in direct contact with the bosom, and are compelled to lie flat against it when turned down. Therefore, I do not claim broadly a curved neck-band, or a neck-band more or less pointed, but—

What I claim as my invention is—

The combination of the shirt-collar, the bosom, and the pointed neck-band with its ends terminated inside of the ends of the collar, the ends of the said collar being in direct contact with the bosom, and the collar and bosom being separated elsewhere by the pointed band, substantially as described and shown.

Witness my hand, this 9th day of December, A. D. 1874.

HENRY GREEN FISK.

Witnesses:
J. H. G. McGLONE,
T. F. GIBBONS.